United States Patent [19]

Gattys

[11] 4,447,476

[45] May 8, 1984

[54] PROCESS FOR STABILIZING DEHYDRATED MAGNESIUM CHLORIDE AGAINST REHYDRATION

[75] Inventor: Franz J. Gattys, Neu-Isenburg, Fed. Rep. of Germany

[73] Assignee: F. J. Gattys Ingenierbüro, Neu-Isenburg, Fed. Rep. of Germany

[21] Appl. No.: 374,109

[22] Filed: May 3, 1982

[30] Foreign Application Priority Data

May 4, 1981 [DE] Fed. Rep. of Germany ....... 3117542

[51] Int. Cl.$^3$ .............................................. B05D 7/00
[52] U.S. Cl. ...................................... 427/215; 264/7; 423/267; 423/629; 427/401; 428/403
[58] Field of Search ............ 427/215, 401; 23/313 R; 264/7; 423/696, 699

[56] References Cited

U.S. PATENT DOCUMENTS 1,592,971  7/1926  Dow ................................... 427/215
3,466,161  9/1969  Perlmutter et al. .............. 23/313 R

*Primary Examiner*—Michael R. Lusignan
*Assistant Examiner*—Janyce A. Bell
*Attorney, Agent, or Firm*—Toren, McGeady and Stanger

[57] ABSTRACT

The present invention relates to a process for stabilizing dehydrated magnesium chloride by coating with a material having a high degree of affinity for water. The coating operation is preferably carried out with magnesium oxide in a layer thickness of at least 0.1 mm, the magnesium oxide being hydroxylated by adding water during the coating operation.

6 Claims, No Drawings

PROCESS FOR STABILIZING DEHYDRATED MAGNESIUM CHLORIDE AGAINST REHYDRATION

The use of magnesium chloride, which is obtained in large amounts as waste material, as the starting material for recovering the hydrogen chloride gas required in other synthesis processes is known. Thus, for example, hydrogen chloride gas is required in the processes of chlorine synthesis according to Deakon with subsequent production of vinyl chloride based on ethylene and in the vinyl chloride synthesis with acetylene. Likewise, magnesium chloride is applied in large amounts as the starting material for the production of metallic magnesium by fusion electrolysis. The disadvantage of using magnesium chloride for these purposes is its high crystal water content of 6 molecules of $H_2O$ per molecule of $MgCl_2$ which is entrained as water vapour in the hydropyrolysis of magnesium chloride and directly dissolves a corresponding amount of hydrogen chloride gas to aqueous hydrochloric acid in the condensation. This portion of aqueous hydrochloric acid constitutes on the one hand a corresponding loss of gaseous hydrogen chloride of up to 66% of the hydrogen chloride gas formed and on the other a waste product which cannot be utilized in another way, at least not in the amount obtained and cannot be deposited without damage to the environment. For this reason magnesium chloride nowadays is first dehydrated to the dihydrate, whereby its crystal water content is reduced either to the amount required or acceptable for the hydropyrolysis to hydrogen chloride and magnesium oxide or for the magnesium-metal electrolysis while the yield of aqueous hydrochloric acid is correspondingly reduced to a negligibly small residue, which can be recycled without difficulties.

To this extent the method described proved to be satisfactory and merely the exceedingly marked hygroscopy of the dehydrated magnesium chloride has been found to be a disadvantage. When storing the magnesium chloride in open containers the hygroscopy causes a direct and spontaneous rehydration to the hexahydrate by absorbing water from the atmosphere and necessitates further processing of the dehydrated magnesium chloride either directly or suitably even in the same reaction chamber with all the problems thus resulting for the operation.

It is the aim of the present invention to provide a process by means of which dehydrated magnesium chloride can be stabilized against rehydration over a lengthy period. The present invention lies in that the magnesium chloride is granulated or pelletized and then coated with a material having an affinity for water.

The present invention provides a process by means of which dehydrated magnesium chloride can be protected and thus stabilized against the admission of moisture and thus against rehydration over a lengthy period even when storing it in open containers. There thus no longer exists the necessity of immediate further processing directly after the dehydration or of providing costly storage conditions. On the contrary, e.g., magnesium chloride dihydrate can be stored in large amounts and also transported, without detriment, to other locations for further processing. This thus results in the advantage of greater flexibility with regard to operational production planning and location finding.

The coating can be carried out with any material suitable as a coating material as long as it has no detrimental effect in the subsequent processing stage. In this respect the coating operation is carried out with advantage with magnesium oxide, which has a high degree of affinity for water while forming magnesium hydroxide and can be coated on the magnesium chloride grain with excellent results in a granulating drum or on a pelleting plate. Furthermore, as a material of substantially the same substance it has no detrimental effect on the subsequent processing stages. This also applies to a hydropyrolysis process with subsequent vinyl chloride synthesis as well as to the fused electrolysis on metallic magnesium. Surprisingly it has been found that the coating with magnesium oxide protects the magnesium chloride grain extremely effectively against rehydration over a lengthy period in that it even chemically bonds the amount of water required for the granulation and that after the completed hydroxylation it prevents further absorption of water from the atmosphere and particularly the admission of moisture to the sheathed magnesium chloride grain. Surprisingly, practically no moisture is yielded from the coating material to the sheathed magnesium chloride grain.

The coats may be applied in any thickness, but suitably in a thickness of at least 0.1 mm. Based on a magnesium chloride grading with a grain of 5 mm in bulk this corresponds to a material relation of 10 to 12% by weight of magnesium oxide, relative to the amount of magnesium chloride applied. For a coating rated in this manner excellent, usually completely satisfactory service lives of more than two months are attained. During this time the water absorption is distinctly less than 2.5% by weight. The results improve substantially as the thickness of the coating increases and at a thickness of the coating of approximately 0.6 mm service lives of up to six months are obtained without substantial absorption of water. A further increase in the thickness of the coating no longer results in an improvement of the service lives and it would render the further processing more difficult.

For the coating, a pre-granulated magnesium chloride grain or even powdered materials, which are consecutively fed into the granulator, can be used as the starting material. However, it has been surprisingly found that even when using powdered materials mixed with each other and adding pelleting water in one operation there is formed a coated granulate, which contains the dehydrated magnesium chloride in its nucleus and exclusively hydroxylated magnesium oxide without any components of magnesium chloride in its outer layer.

The amount of water absorbed by the magnesium chloride to a minor extent during this operation is acceptable or it can be taken into account in the preceding dehydration in such a way that the magnesium chloride dehydrates beyond the intended final amount of crystal water and is brought to the intended content of crystal water by the amount of water absorbed during the pelleting operation.

The magnesium chloride applied as the coating material can be used as a dry powder or as a powder hydroxylated partially to approximately 50% and is completely hydroxylated with advantage by adding water continuously during the pelleting and coating operations, the total amount of water added suitably exceeding the stoichiometric amount required for the conversion of the magnesium oxide into magnesium hydroxide maximally by up to 30% by weight, preferably by 10 to 20% by weight. The exceeding amount serves for bringing about and accelerating the agglomeration of the materials applied in the powdered form.

The present invention is explained by means of the Examples hereafter.

EXAMPLE 1

100 kg of pre-granulated magnesium-chloride dihydrate (MDH) having a composition of $MgCl \times 1.5$ to $2.5\ H_2O$ and a granulation of 5 mm in bulk are put into the granulating drum. While rotating the drum continuously 11 kg of magnesium oxide are added and mixed fairly well during 5 to 10 minutes, whereupon in the course of approximately 3 to 4 minutes 6.5 kg of water (30% excess over the amount required for the formation of $Mg(OH_2)$) are sprayed on the contact walls of the pelleting drum. After a further treatment time of approximately 10 to 15 minutes the coating operation is completed. The pellets formed then have a magnesium-hydroxide coating of approximately 0.1 mm thickness and show good mechanical strength. The increase in weight by absorption of moisture when stored open for six weeks at a room temperature of 18° to 22° C. and an average relative humidity of 80% is between 1.8 and 2.2% by weight, i.e., on the average 2.0% weight, for ten samples measured.

EXAMPLE 2

100 kg of powdered MDH and 27.5 kg of powdered dry magnesium oxide are put into a pelleting drum and intimately mixed for a period of 5 minutes, whereupon during a period of 5 to 6 minutes 15 kg of water (12.5 kg+2.5 kg excess) are evenly sprayed on the contact walls of the pelleting apparatus. The pellets thus formed have in their nuclei spherically agglomerated magnesium chloride in an average composition of $MgCl_2 \times 2.5\ H_2O$ and an outer sheath of magnesium hydroxide in a layer thickness of approximately 0.25 mm. After a storage time of three months in open containers at a room temperature of 18° to 22° C. and a relative humidity of 80% the increase in weight by moisture absorption is between 1.75 and 2.1% by weight for ten samples measured.

EXAMPLE 3

After putting 100 kg of MDH into the pelleting apparatus 13.5 kg of magnesium oxide, hydrated to 50%, are added and intermixed, whereupon 4 kg of water are sprayed on the inside contact walls of the pelleting apparatus during a period of approximately 3 to 4 minutes. After a further treatment time of 10 to 15 minutes the coating operation is completed. The pellets thus obtained have the same shape and properties as the pellets in Example 1.

I claim:

1. A process for stabilizing dehydrated magnesium chloride against hydration, characterized by one of granulating and pelletizing the dehydrated magnesium chloride, providing the one of granulated and pelletized magnesium chloride with a coating of a material having a high degree of affinity for water, carrying out the coating operation using magnesium oxide, feeding the magnesium oxide into a granulator as a dry partially hydroxylated powder and completely hydroxylating the magnesium oxide during the granulation by adding water.

2. A process according to claim 1, characterized by granulating the magnesium oxide while adding water in an amount which exceeds the amount required for converting the magnesium oxide into magnesium hydroxide by up to a maximum of 30% by weight.

3. A process according to claim 1, characterized by granulating the magnesium oxide while adding water in an amount which exceeds the amount required for converting the magnesium oxide into magnesium hydroxide in an amount in the range of 10 to 20% by weight.

4. A process according to claims 1, 2 or 3, characterized by jointly feeding the magnesium chloride and the magnesium oxide into the granulator in the powdered form and granulating the magnesium chloride and magnesium oxide while continuously adding the amount of water required for the hydroxylation of the magnesium oxide and for the granulation.

5. A process according to claims 1, 2 or 3, characterized in that the coating is carried out in a layer thickness of at least 0.1 mm.

6. A process according to claim 1, 2 or 3, characterized in that the coating is carried out in a layer thickness in the range of 0.1 to 0.25 mm.

* * * * *